US009165388B2

(12) United States Patent
Delia et al.

(10) Patent No.: US 9,165,388 B2
(45) Date of Patent: Oct. 20, 2015

(54) METHOD OF AUTOMATIC CROPPING

(75) Inventors: David J. Delia, Lagrangeville, NY (US); Wayne M. Delia, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 2088 days.

(21) Appl. No.: 12/235,282

(22) Filed: Sep. 22, 2008

(65) Prior Publication Data

US 2010/0073402 A1 Mar. 25, 2010

(51) Int. Cl.
*G09G 5/00* (2006.01)
*G06T 11/60* (2006.01)

(52) U.S. Cl.
CPC ...................................... *G06T 11/60* (2013.01)

(58) Field of Classification Search
USPC .................................... 345/620; 382/289, 298
See application file for complete search history.

(56) References Cited

U.S. PATENT DOCUMENTS

| | | | | |
|---|---|---|---|---|
| 5,511,148 | A * | 4/1996 | Wellner | 358/1.6 |
| 5,781,665 | A * | 7/1998 | Cullen et al. | 382/254 |
| 5,838,836 | A * | 11/1998 | Omvik | 382/276 |
| 5,901,253 | A * | 5/1999 | Tretter | 382/289 |
| 5,978,519 | A * | 11/1999 | Bollman et al. | 382/282 |
| 6,009,197 | A * | 12/1999 | Riley | 382/199 |
| 6,430,320 | B1 | 8/2002 | Jia et al. | 382/289 |
| 6,556,721 | B1 * | 4/2003 | Wang et al. | 382/282 |
| 6,907,136 | B1 * | 6/2005 | Shigemori | 382/118 |
| 7,133,571 | B2 * | 11/2006 | Cheatle | 382/282 |
| 7,162,102 | B2 | 1/2007 | Cahill et al. | |
| 7,269,292 | B2 | 9/2007 | Steinberg | |
| 7,386,190 | B2 * | 6/2008 | Lin et al. | 382/294 |
| 7,529,390 | B2 * | 5/2009 | Zhang et al. | 382/118 |
| 7,864,978 | B2 * | 1/2011 | Anthony et al. | 382/100 |
| 2001/0014183 | A1 * | 8/2001 | Sansom-Wai et al. | 382/289 |
| 2005/0276477 | A1 * | 12/2005 | Lin et al. | 382/173 |
| 2006/0153470 | A1 | 7/2006 | Simon et al. | |
| 2006/0228044 | A1 | 10/2006 | Yeh et al. | |
| 2007/0057815 | A1 | 3/2007 | Foy et al. | |
| 2007/0076979 | A1 | 4/2007 | Zhang et al. | |
| 2007/0201765 | A1 | 8/2007 | DuBois | |
| 2008/0181512 | A1 | 7/2008 | Gavin et al. | |
| 2009/0052792 | A1 * | 2/2009 | Curtis | 382/254 |

FOREIGN PATENT DOCUMENTS

WO WO 2006/050395 A2 5/2006

OTHER PUBLICATIONS

Suh et al., "Automatic Thumbnail Cropping and its Effectiveness," Letters CHI, vol. 5, Issue 2, pp. 95-104.
Ke et al., "Efficient Near-duplicate Detection and Sub-image Retrieval," MM '04, Oct. 10-16, 2004, New York, NY, USA, pp. 869-876.
Foo et al., "Detection of Near-duplicate Images for Web Search," CIVR'07, Jul. 9-11, 2007, Amsterdam, The Netherlands, pp. 557-564.

* cited by examiner

*Primary Examiner* — M Good Johnson
(74) *Attorney, Agent, or Firm* — George R. McGuire; Bond Schoeneck & King, PLLC; John Pivnichny

(57) ABSTRACT

A method for rectangular cropping including the steps of: (i) providing a sequence of images on a graphical interface device; (ii) analyzing each pixel in the first image included in the sequence of images; (iii) locating a boundary between the background of the first image and the border of the first image; (iv) determining the degree off true horizontal of the first image; (v) rotating the first image based on the determining step; (vi) applying a cropping operation to the first image; and (vii) automatically applying the cropping operation to each other image in the sequence of images.

7 Claims, 2 Drawing Sheets

METHOD OF AUTOMATIC CROPPING

BACKGROUND

1. Field of the Invention

The present invention relates to digital image processing and more particularly to digital image processing performed, at least in part, with human aesthetic input.

2. Description of the Related Art

Methods exist to enable manual straightening and manual rectangular cropping of digital images in many popular image editing programs such as Google Picasa (the terms Google and/or Picasa may be subject to trademark rights in the US and/or internationally), but these operations are generally limited to editing one image at a time. High-end commercial versions of professional image editing programs feature an automatic straightening tool, which is capable of analyzing pixels within a digital image to permit "true horizontal" alignment, by detecting the horizon in an image's background, or detecting sea level, and calculating the angle of difference from the true horizontal perspective. The image is then adjusted by the same angular amount, resulting in the automatic straightening of the single image. Rectangular cropping of sections of a digital image, however, is not typically automated, since too often it depends on the personal preference of the user.

It is conventional for image editing software to allow a human user to manually select a portion of a larger digital image, and then crop the image based on the selection manually made by the user. It is also conventional for digital image editing software to allow human users to manually create macros and/or scripts by recording operations performed by the user on a given image and later applying the recorded macro to other images. For example, an editing macro can be defined such that each digital image in a batch is cropped at a specific location coordinates within each image of the batch, but these predetermined location coordinates may not be suitable or desirable for all images in the batch.

Automatic cropping of digital images is also conventional. For example, US patent application 2006/0228044 ("Yeh") discloses a method for automatically cropping image objects. In the Yeh method, an object contour detecting step written into computer software detects an image object contour with a Modified Laplacian Contour Detector to generate a binary image. The automatic cropping of the single image is based on the automatic, algorithm based image detection.

US patent application 2007/0076979 ("Zhang") discloses a cropping system that automatically crops an image by selecting an image template whose condition is best satisfied by the image and then by selecting a cropping of the image that best attains the goal of the selected image template. The cropping is based on automatic, algorithm-based, software-implemented detection of a face area and/or an attended area.

US patent application 2007/0201765 ("DuBois") discloses an image processing system that allows a user to upload a digital image in an initial frame size and indicate the desired finished print size. The DuBois system then searches for the presence and location of an area of interest in the digital image. Upon determining the location of the area of interest through the use of an algorithm, the system then calculates a crop border size and placement based on this software-based determination.

US patent application 2008/0181512 ("Gavin") discloses an image editing system that detects regions of the image representing faces, stores the data representing the coordinates of the faces as points of interest, receives user input adding additional points of interest, determines the portion of the image containing the maximum number of points of interest that will fit within the crop area, and crops the image. The combination of data representing manually user-specified portions of an image is referred to, in Gavin, as a point of interest. These points of interest may take the shape of a square, rectangle, or other quadrilateral, a circle, an ellipse, or any other closed two-dimensional shape. A user operates a client computer to manage and manipulate points of interest on a computer image. The user can add, reposition, and resize points of interest through the graphical user interface. Software may also automatically detects points of interest by using algorithms such as face detection and feature recognition. The software-detected points of interest are also presented to the user in a graphical fashion, allowing the user to adjust or deleted the automatically-detected points of interest manually. Once these points of interest have been finally determined, they are stored in a along with the digital image and used appropriately as the image is displayed in different contexts. It is noted that the Gavin points of interest are only disclosed to be used with the particular, identical image that was used to manually determine or adjust them, and are not disclosed to be used in connection with other images in a batch of images.

Other publications which may be of possible interest include: (i) U.S. Pat. No. 7,162,102 ("Cahill"); (ii) U.S. Pat. No. 7,269,292 ("Steinberg"); (iii) US patent application 2007/0057815 ("Foy"); (iv) International patent application WO2006050395 ("Abnet"); (v) article entitled "Automatic Thumbnail Cropping and its Effectiveness" ("Suh Article"); (vi) article entitled "Detection of Near-Duplicate Images For Web search" ("Foo Article"); (vii) article entitled "Efficient Near-Duplicate Detections and Sub-Image Retrieval" ("Ke Article"); and/or (xiii) US patent application 2006/0153470 ("Simon").

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

SUMMARY

The present invention is directed to various methods of automatic cropping of multiple digital images (see DEFINITIONS section) based on an input from the user relating to variable co-ordinate features (see DEFINITIONS section). Preferably, the human user identifies the variable co-ordinate features on one digital image of a batch, and this identification is used to make a dynamic template (see DEFINITIONS section) used to crop the other images in the batch. The present invention is directed to various methods to automatically perform cropping operations based on the dynamic template provided by the manual editing of one or more of the digital images. In some preferred embodiments, the variable coordinate feature identified by the user is a rectangular boundary between areas of two different colors, and the dynamic template is dynamic in the sense that it locates the boundary, even when this boundary occurs at different location co-ordinates in different digital images.

Some embodiments of the present invention are directed to various methods of performing automatic rectangular cropping operations against a sequence of several or many similar digital images based on the cropping parameters applied to the first image in the sequence. In some preferred embodiments, an automatic image straightening operation is applied. This is especially preferable in embodiments where the variable coordinate feature identified by the user is a rectangular boundary between areas of two different colors.

Some embodiments of the present invention are directed a computer program which presents a user interface through which a directory containing a sequence of digital image files can be specified. Preferably, the first file in the sequence (alphabetically by file name, or chronologically by earliest creation time) is presented to the user to obtain the sequence of editing parameters and operations to be applied to each subsequent image in the sequence of images to be edited. However, unlike conventional image editing macros, at least one of the operations is cropping based on variable co-ordinate features, such as a rectangular boundary that can occur at various location co-ordinates within each digital image in the sequence of digital images.

According to one aspect of the present invention, a method of processing digital images includes the following steps (performed in the following order only to the extent necessary to render the method operable): (i) providing user input devices, an image processing program, a display and an initial raw digital image; (ii) determining an outer boundary of the initial raw digital image; (iii) displaying the initial raw digital image on the display; (iv) manually cropping, by a human user, the initial raw digital image using the image processing program and the input devices to form an initial processed image; (v) defining a dynamic template based upon the outer boundary determined at the determining step and the cropping performed by the human user at the cropping step; (vi) selecting at least one additional raw digital image; and (vii) automatically cropping the at least one additional raw digital image(s) based upon the dynamic template to form at least one additional processed image(s).

According to a further aspect of the present invention, an image processing module includes a graphical user interface sub-module; a pattern recognition sub-module; a cropping sub-module; and a dynamic template sub-module. The graphical user interface sub-module is programmed and/or structured to display image processing data on a visual display and to receive image editing data from human users through at least one user input device(s). The pattern recognition sub-module is programmed and/or structured to determine an outer boundary of an initial raw digital image. The cropping sub-module is programmed and/or structured to perform manual cropping on the initial raw digital image based on crop lines input by the human user through the graphical user interface sub-module. The dynamic template sub-module is programmed and/or structured to define a dynamic template based upon the outer boundary determined by the pattern recognition sub-module and the cropping performed by the cropping sub-module. The cropping sub-module is further programmed and/or structured to automatically crop at least one additional raw digital image(s) based upon the dynamic template to form at least one additional processed image(s).

According to a further aspect of the present invention, a computer readable medium has recorded thereon in computer readable form image processing software. the image processing software includes: a graphical user interface software portion; a pattern recognition software portion; a cropping software portion; and a dynamic template software portion. The graphical user interface software portion is programmed to display image processing data on a visual display and to receive image editing data from human users through at least one user input device(s). The pattern recognition software portion is programmed to determine an outer boundary of an initial raw digital image. The cropping software portion programmed to perform manual cropping on the initial raw digital image based on crop lines input by the human user through the graphical user interface software portion. The dynamic template software portion programmed to define a dynamic template based upon the outer boundary determined by the pattern recognition software portion and the cropping performed by the cropping software portion. The cropping software portion is further programmed to automatically crop at least one additional raw digital image(s) based upon the dynamic template to form at least one additional processed image(s).

According to one aspect of the present invention, a method of processing digital images includes the following steps (performed in the following order only to the extent necessary to render the method operable): (i) providing user input devices, an image processing program, a display and an initial raw digital image; (ii) identifying a variable co-ordinate feature in the initial raw digital image; (iii) manually cropping, by a human user, the initial raw digital image using the image processing program and the input devices to form an initial processed image; (iv) defining a dynamic template based upon the spatial relationship between the variable co-ordinate feature and the cropping performed by the human user at the cropping step; (v) selecting at least one additional raw digital image(s); and (vi) automatically cropping the at least one additional raw digital image based upon the dynamic template to form at least one additional processed image(s).

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
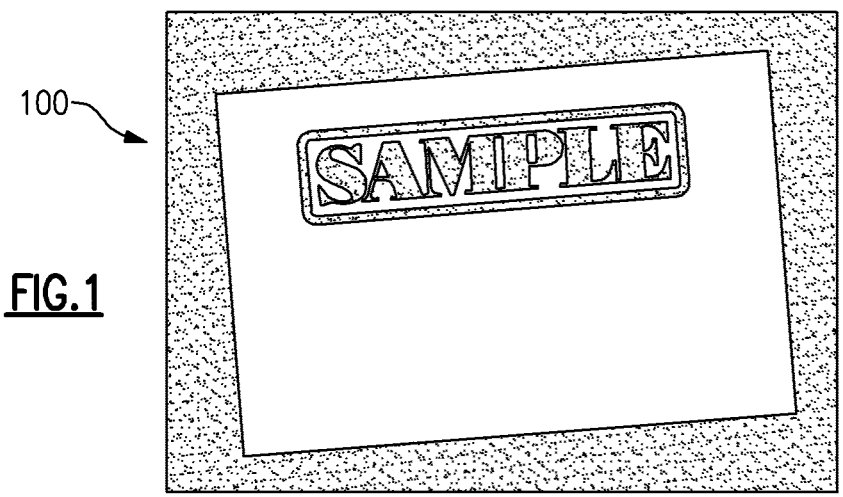
FIG. 1 is a raw digital image to which the present invention may be applied.
Figure 2:
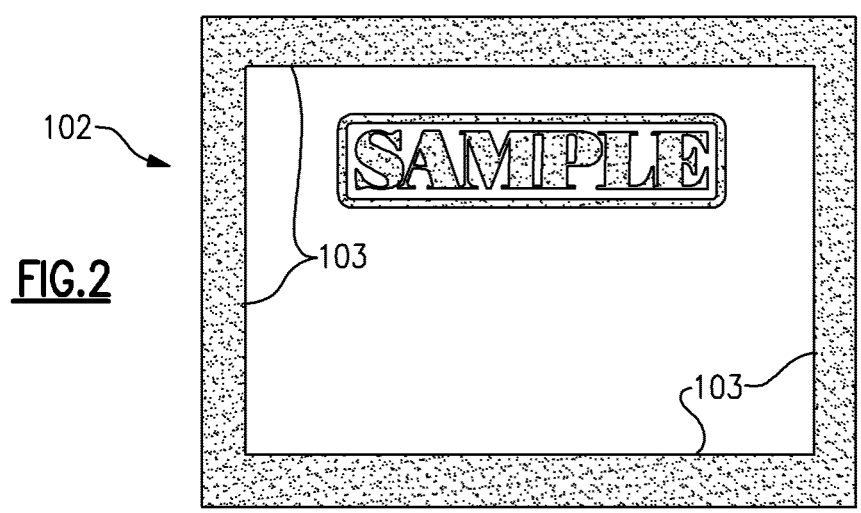
FIG. 2 is the image of FIG. 1 after auto straightening has been applied.

An method according to the present invention will now be discussed. FIG. 1 shows an initial image 100 in the form of a generally white rectangular object against a black background. An automatic image straightening operation is then applied to: (i) detect the boundary between the white object and the black background of the object; (ii) determine the angle of the white object off true horizontal; and (iii) rotating the white object to be aligned with orthogonal horizontal and vertical axes. The resulting intermediate image 102 is shown in FIG. 2.

Figure 3:
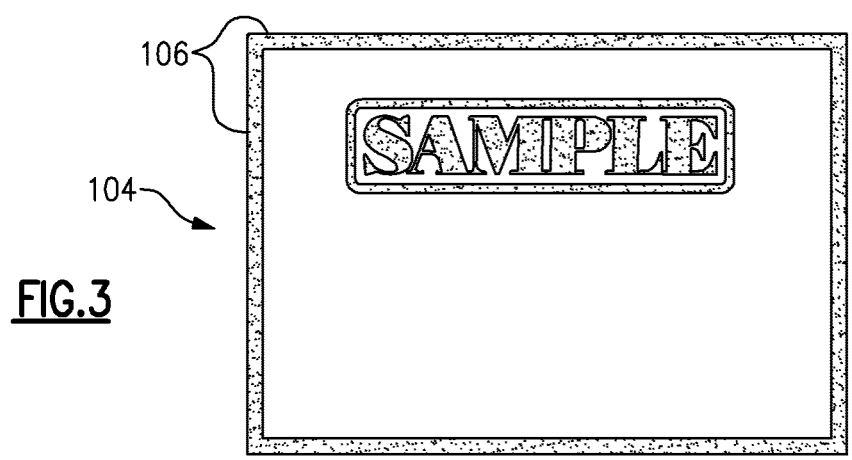
FIG. 3 is the image after it has been manually cropped to make a dynamic template according to the present invention.

Next, a human user crops the image relative to boundary 103. In this example, the human user decides to leave a black border of perhaps ten pixels around the boundary 103, resulting in the final version 104 shown in FIG. 3.

Preferred embodiments of the invention are designed for use with digital images featuring rectangular objects (trading cards, computer chips, medical X-ray images, etc.) which will often be desired to have a border of a certain width and color. When the user crops the initial image (as shown by comparing FIG. 2 to FIG. 3), the border itself is determined by the pixel-analyzing techniques in the image processing module or software. Generally, the border will be determined as the outermost uniform-colored area surrounding the interior object to be straightened and centered. The analysis of the border is preferably from the outside of the template image, proceeding inwards. Thus, after the manual editing of the template image, the analysis may determine, for example, a black border of perhaps 10 pixels on each side, followed by the detection of a white area which represents the object (as further explained below in connection with FIGS. 1 to 3). If the initial editing step results in cropping an object so closely such that the image processing module or software detects no border, then there are several possibilities that could be designed into the image processing software or module: (i) automatically add a predetermined border; (ii) automatically crop all images to have no border; or (iii) ask the human user to specify a border preference.

In this way, the human user creates a dynamic template which instructs the image processor to search for a black/white rectangular boundary within a digital image, and to use this as a basis for determining cropping lines. The black/white rectangular boundary is a variable co-ordinate feature and the dynamic template is based upon this variable co-ordinate feature. Each subsequent image in the sequence of digital images is cropped in a similar manner as the first, based on the dynamic template generated from the editing parameters applied to the first image in the sequence. In other words, the image processor will first locate the corresponding variable co-ordinate feature (that is, a black/white boundary) within each subsequent image and then perform the cropping based on this variable co-ordinate feature (in this case, performing the cropping 10 pixels peripherally outward from the variable co-ordinate feature). Alternatively, the cropping could be done at the boundary or inside the boundary. The cropping could also be non-rectangular, such as cropping with a zigzag boundary or cropping with rounded corners. While the dynamic template is based on the variable co-ordinate feature identified by the user, the dynamic template may or may not simply crop around immediately around the variable co-ordinate feature.

Figure 4:
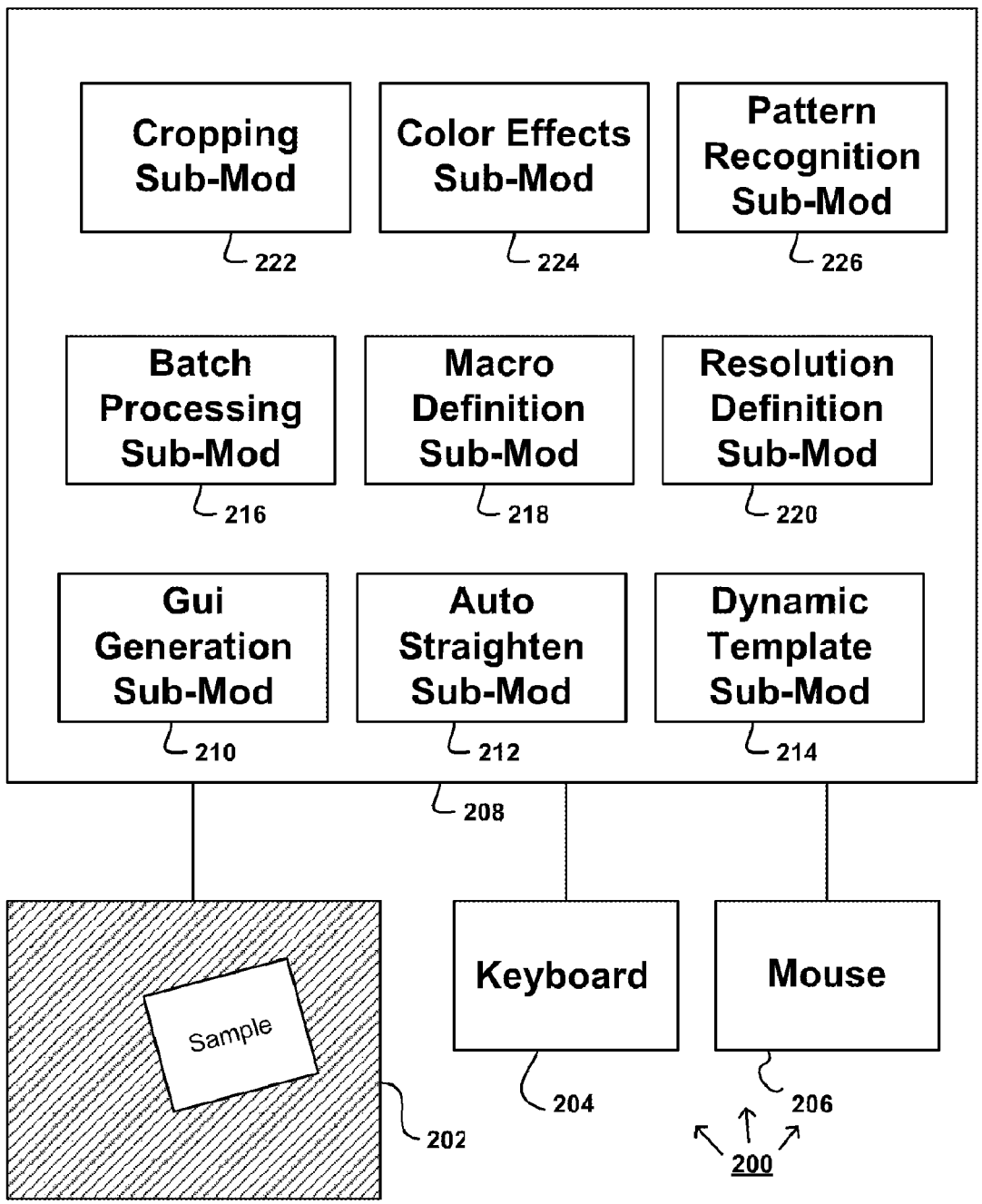
FIG. 4 is a block diagram of an image processing system according to the present invention.

The methods of the present invention are preferably implemented by a computer program, which computer program may be implemented on a stand-alone computer; on a server computer; distributed over multiple computers; on a recordable medium; in volatile memory(ies); in non-volatile memory(ies); as a stand-alone program; as a set of features within a larger program; as software and/or as some combination of software, hardware and/or firmware. FIG. 4 shows a system 200 according to the present invention, including: display 202; keyboard 204; mouse 206; and image processing module 208. The image processing module includes: GUI generation sub-module 210; auto-straighten sub-module 212; dynamic template sub-module 214; batch processing sub-module 216; editing macro definition sub-module 218; resolution definition sub-module 220; cropping sub-module 222; color effects sub-module 224; and pattern recognition sub-module 226.

The display is a visual display for the human user to use when editing images generally, and also when selecting variable co-ordinate features for use in dynamic templates according to the present invention. The display may be any type of computer display now known or to be developed in the future. The keyboard and mouse are user input devices for the human user to use when editing images generally, and also when selecting variable co-ordinate features for use in dynamic templates according to the present invention. The user input devices are not limited to keyboards and mice, and may be any type of user input devices now known or to be developed in the future.

The GUI generation sub-module presents a user interface on the display through which a directory containing a sequence of digital image files can be specified. According to a preferred embodiment of the present invention, the first file in the sequence (alphabetically by file name, or chronologically by earliest creation time) is presented to the user to obtain the sequence of editing parameters and operations to be applied to each subsequent image in the sequence of images to be edited. For example, the image of FIGS. 1 to 3 went through the following operations: (i) analyze each pixel in the raw image file to locate the boundary between the black background and the white object using the pattern recognition sub-module; (ii) determine the angle off true horizontal/vertical using the auto-straighten sub-module; (iii) rotate the object within the image so that the border of the card aligns with orthogonal horizontal and vertical axes; and (iv) having a human user apply a cropping operation (using the input devices and the cropping sub-module) such that a border of 10 pixels of dark black background remains.

The cropping operation of step (iv) may be done through various kinds of user interfaces, such as defining the location and/or profile of crop lines with a mouse, adjusting location or shape of crop lines with arrow keys on a keyboard, using the keyboard to type in numerical co-ordinates, using a touch screen, or the like.

The cropping operation in step (iv) is based upon the black/white boundary, which is a variable co-ordinate feature because this boundary will not occur at the same co-ordinates in other images, even if they do have a very similar black/white boundary. The variable co-ordinate feature of the black/white boundary and the 10 pixel boundary chosen by the human user together define the dynamic template, which is defined and stored by the dynamic template sub-module so that it can be used later on other images. In this example, the batch processing sub-module calls later images in the sequence and applies the dynamic template to crop them with a 10 pixel border peripherally outwards of their respective black/white borders. In other words, the dynamic template uses the variable co-ordinate feature (the border) and additionally applies other additional cropping techniques chosen by the user (in this case a 10 pixel border). In some embodiments of the present invention, the cropping may simply follow the variable co-ordinate feature, like if the human user in the previous example had not opted for a 10 pixel border, but merely wanted cropping to occur at the boundary. The dynamic template may include other image processing such as adding a border within the dynamically cropped area, resolution adjustment by the resolution definition sub-module, color effects by the color effects sub-module, and/or the like.

The cropping operation of step (iv) involves determining the location of the beginning of the boundary of the object in each direction (top, left, right, and bottom), then adjusting the pixel width of the border so that a border similar to the original edited image is produced. The advantage of this approach over that of a typical editing macro based on fixed positions for cropping is that the optionally straightened object in the image will not necessarily be in the same position within each image. Cropping based on fixed positions (that is, not based on a variable co-ordinate feature) will produce inconsistent and undesirable results, while the method of the present invention enables accurate cropping based on the position of the object in the image to be cropped. In some preferred embodiments of the invention, the variable co-ordinate feature of interest will be a rectangular boundary between contrasting shades for one or more of the following reasons: (i) this is a commonly occurring pattern when scanned images are used as raw image data that needs to be cropped; (ii) the rectangular shape of this variable co-ordinate feature makes pattern recognition algorithms simpler; (iii) the rectangular shape of this variable co-ordinate feature makes pattern recognition more reliable (for example when working to lower resolutions and/or image quality); and (iv) it is often desirable to have rectangularly shaped post process images.

Although rectangular boundary patterns are preferred as variable co-ordinate features upon which to base dynamic templates, the present invention is not necessarily limited to this. For example, in some embodiments of the present invention, the human user may crop along an irregular shaped (that is, non-rectangular) boundary by: (i) cropping right along the irregular boundary; (ii) by cropping at a relatively consistent distance outside the boundary line; or (iii) by cropping at a relatively consistent distance inside the boundary line. In this case, the dynamic template would define similar cropping on images where a similar irregular boundary is found based on that irregular boundary in a way similar to the way the human user's cropping was based upon the corresponding boundary in the original image. As the nature of the boundaries become more complex, it may be helpful for the user to manually crop more than one image to help teach the pattern recognition module how to recognize the boundary of interest over a range of somewhat different images.

Although boundary patterns are preferred as variable co-ordinate features upon which to base dynamic templates, the present invention is not necessarily limited to this. For example, in some embodiments of the present invention, the human user may crop so that the boundaries are so many pixels away from the edge of the nearest recognizable face. In other words, the variable co-ordinate features would be faces generally and the dynamic template would base the crop lines the way a human user backed crop lines away from faces when editing one of the images in a batch. As another example, in some embodiments of the present invention, the human user may crop so that the boundaries are so many pixels away from some piece of text occurring in the raw image data and detected by the pattern recognition sub-module. The present invention may use any type of pattern recognition now known or to be developed in the future.

It should be understood that auto straightening by the auto straighten sub-module 212, while desirable for both the manually cropped image and the automatically cropped images is preferred for embodiments of the present invention using rectangular boundaries as the variable co-ordinate feature, but this step not a necessary part of all methods according to the present invention. When auto straightening is used it may be based upon detected boundaries to the edges of the image and/or lines (for example, horizon lines) within the image itself.

Dynamic template module 214 stores the dynamic templates. In some embodiments there will be only one fundamental dynamic template, such as cropping at human user determined distances away from a rectangular boundary. In other embodiments, there may be many different types of templates based upon many different types of variable co-ordinate features.

Batch processing sub-module 216 automatically processes other images in the user defined batch, or user defined sequence, based on the dynamic template defined by the user by the act of manual cropping. Alternatively, macro definition sub-module 218 can be used to make cropping based one or more selected dynamic templates be, or be part of, an image editing macro. For example, say that a user defines the following two dynamic templates: (i) rectangle_border (to crop along a rectangular outer boundary of a rectangular image); and (ii) faces__25 (to crop any orthogonal edge of an image that is more than 25 pixels away from the nearest recognizable face). The user may then define an editing macro to perform rectangle_border, then faces__25 and then convert to black and white (using color effects sub-module 224). In this way, one or more dynamic templates can be selected for any arbitrary images at any time, even over multiple editing sessions.

Systems according to the present invention may be used in connection with the following technologies: Tech Tag 600 Software/Services/Applications/Solutions-60S Data Handling Programs (for example, data mining; pattern recognition; analysis; transcoding; other data conversion). The type of product or service that might include the invention includes, but is not limited to digital photo image editing software packages. One application of the present invention is in digital imaging application programs, with additional applicability in manufacturing environments in which sequences of rectangular images must be analyzed—such as in semiconductor chip manufacturing lines. Another possible application is medical applications.

DEFINITIONS

The following definitions are provided to facilitate claim interpretation:

Present invention: means at least some embodiments of the present invention; references to various feature(s) of the "present invention" throughout this document do not mean that all claimed embodiments or methods include the referenced feature(s).

First, second, third, etc. ("ordinals"): Unless otherwise noted, ordinals only serve to distinguish or identify (e.g., various members of a group); the mere use of ordinals implies neither a consecutive numerical limit nor a serial limitation.

digital images: includes, but is not necessarily limited to, still images, moving picture images, slide shows, gifs, scanned images of photographs, black and white images, infrared images, ultrasound images and/or x-ray images.

variable co-ordinate features: any feature in a digital image that: (i) can be automatically recognized by computer software (now or in the future); and (ii) is not in the form of absolute locations co-ordinates within the image; in other words, the feature must be recognizable through the computer software without necessarily being located to pre-determined location coordinates within the image; examples of variable co-ordinate features include, but are not necessarily limited to: rectangular boundary recognition; irregular boundary recognition; text recognition; pattern recognition and/or facial recognition.

dynamic template: a template for digital image cropping based, at least in part, on variable co-ordinate features; dynamic templates include, but are not limited to: rectangular shaped cropping templates and/or irregular shaped cropping templates.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control. If the definitions provided above are broader than the ordinary, plain, and accustomed meanings in some aspect, then the above definitions shall be considered to broaden the claim accordingly.

To the extent that a patentee may act as its own lexicographer under applicable law, it is hereby further directed that all words appearing in the claims section, except for the above-defined words, shall take on their ordinary, plain, and accustomed meanings (as generally shown by documents such as dictionaries and/or technical lexicons), and shall not be considered to be specially defined in this specification. In the situation where a word or term used in the claims has more than one alternative ordinary, plain and accustomed meaning, the broadest definition that is consistent with technological feasibility and not directly inconsistent with the specification shall control.

Unless otherwise explicitly provided in the claim language, steps in method steps or process claims need only be performed in the same time order as the order the steps are recited in the claim only to the extent that impossibility or extreme feasibility problems dictate that the recited step order (or portion of the recited step order) be used. This broad interpretation with respect to step order is to be used regardless of whether the alternative time ordering(s) of the claimed steps is particularly mentioned or discussed in this document.

What is claimed is:

1. A method of processing digital images, the method comprising the steps of:
   providing user input devices, an image processing program, a display and an initial raw digital image;
   determining an outer boundary of the initial raw digital image;
   displaying the initial raw digital image on the display;
   manually cropping, by a human user, the initial raw digital image using the image processing program and the input devices to form an initial processed image;
   defining a dynamic template based upon the outer boundary determined at the determining step and the cropping performed by the human user at the cropping step;
   selecting at least one additional raw digital image;
   automatically cropping the at least one additional raw digital image(s) based upon the dynamic template to form at least one additional processed image(s);
   wherein:
   at the manually cropping step, the human user manually crops the initial raw digital image to form an initial processed image in the shape of a rectangle; and
   at the automatically cropping step, the dynamic template crops the at least one additional raw digital image(s) to form at least one additional processed image the shape of a rectangle; and
   the method further comprises the step of:
   prior to the automatically cropping step, auto straightening the additional raw digital image.

2. The method of claim 1 wherein:
   the initial raw digital image is in the shape of a rectangle; and
   the outer boundary determined by the determining step is in the shape of a rectangle.

3. The method of claim 2 wherein the determining step comprises the sub-steps of:
   analyzing each pixel in the initial raw digital image; and
   locating the outer boundary between a background of the initial raw digital image and the outer edges of an object in the raw initial digital image.

4. The method of claim 1 wherein the defining step comprises the sub-steps of:
   calculating a border between the outer boundary determined by the determining step and crop lines selected by the human user at the manual cropping step; and
   adjusting the dynamic template based on the border determined at the calculating sub-step.

5. The method of claim 4 wherein the automatically cropping step includes the sub-steps of:
   determining an outer boundary of the at least one additional raw digital image; and
   cropping the at least one additional raw digital image(s) based upon the dynamic template, as adjusted at the adjusting sub-step, to form at least one additional processed image with a border similar to the border selected by the human user with respect to the initial raw digital image.

6. The method of claim 1 further comprising the steps of:
   prior to the manually cropping step, selecting a batch of digital images including the initial raw image and a plurality of additional raw digital images; and
   automatically repeating the automatically cropping step for each additional raw digital image to respectively form a corresponding additional processed image based upon the dynamic template.

7. A method of processing digital images, the method comprising the steps of:
   providing user input devices, an image processing program, a display and an initial raw digital image;
   identifying a variable co-ordinate feature in the initial raw digital image;
   manually cropping, by a human user, the initial raw digital image using the image processing program and the input devices to form an initial processed image;
   defining a dynamic template based upon the spatial relationship between the variable co-ordinate feature and the cropping performed by the human user at the cropping step;
   selecting at least one additional raw digital image(s); and
   automatically cropping the at least one additional raw digital image based upon the dynamic template to form at least one additional processed image(s).

* * * * *